United States Patent [19]

Neukamm

[11] 3,909,410
[45] Sept. 30, 1975

[54] PROCESS FOR TREATING SEWAGE SLUDGE

[75] Inventor: Heinz H. Neukamm, Brantford, Canada

[73] Assignees: W. Elmo Young, London; Harold J. young, Mount Albert; T. Lloyd Young, Brampton; Mary Joan Tanner, London, all of Canada

[22] Filed: Aug. 8, 1974

[21] Appl. No.: 495,891

Related U.S. Application Data

[63] Continuation of Ser. No. 333,539, Feb. 20, 1973, abandoned.

[52] U.S. Cl. .................. 210/71; 118/303; 210/179; 210/189; 210/259
[51] Int. Cl.² .......................................... C02B 1/02
[58] Field of Search ...... 117/109; 118/19, 303, 418; 210/29, 66, 68, 71, 152, 179, 189, 259

[56] References Cited
UNITED STATES PATENTS

| | | | |
|---|---|---|---|
| 1,830,489 | 11/1931 | Sproat............................. | 118/418 X |
| 1,908,539 | 5/1933 | Quick .............................. | 118/418 X |
| 2,723,954 | 11/1955 | Young .............................. | 210/29 |
| 2,758,039 | 8/1956 | Barbour........................... | 117/109 X |
| 3,123,498 | 3/1964 | Braak et al. ..................... | 118/418 X |

FOREIGN PATENTS OR APPLICATIONS

| | | | |
|---|---|---|---|
| 1,020,552 | 12/1957 | Germany........................... | 118/303 |

*Primary Examiner*—Frank A. Spear, Jr.
*Assistant Examiner*—Robert G. Mukai
*Attorney, Agent, or Firm*—Christen & Sabol

[57] ABSTRACT

An improved method is described for treating sewage sludge. The sludge in the form of a slurry is continuously distributed onto preheated aggregate pieces which are continuously fed into a lower region of a rotating contactor drum. A portion of the slurry substantially instantaneously adheres to the heated aggregate and the non-adhering slurry passes through perforations in the drum for recycle. The aggregate with adhering sludge is carried upwardly by means of baffles in the drum and is dumped into a collector trough in an upper region of the drum. This coated aggregate is subjected to further heating as it travels down an inclined path to dry the coating into a hard encrustation and enters a tumbler drum which breaks the sludge coating away from the aggregate and pulverizes the sludge into a dust or powder. This dust is collected as product and the decoated aggregate is recycled.

1 Claim, 5 Drawing Figures

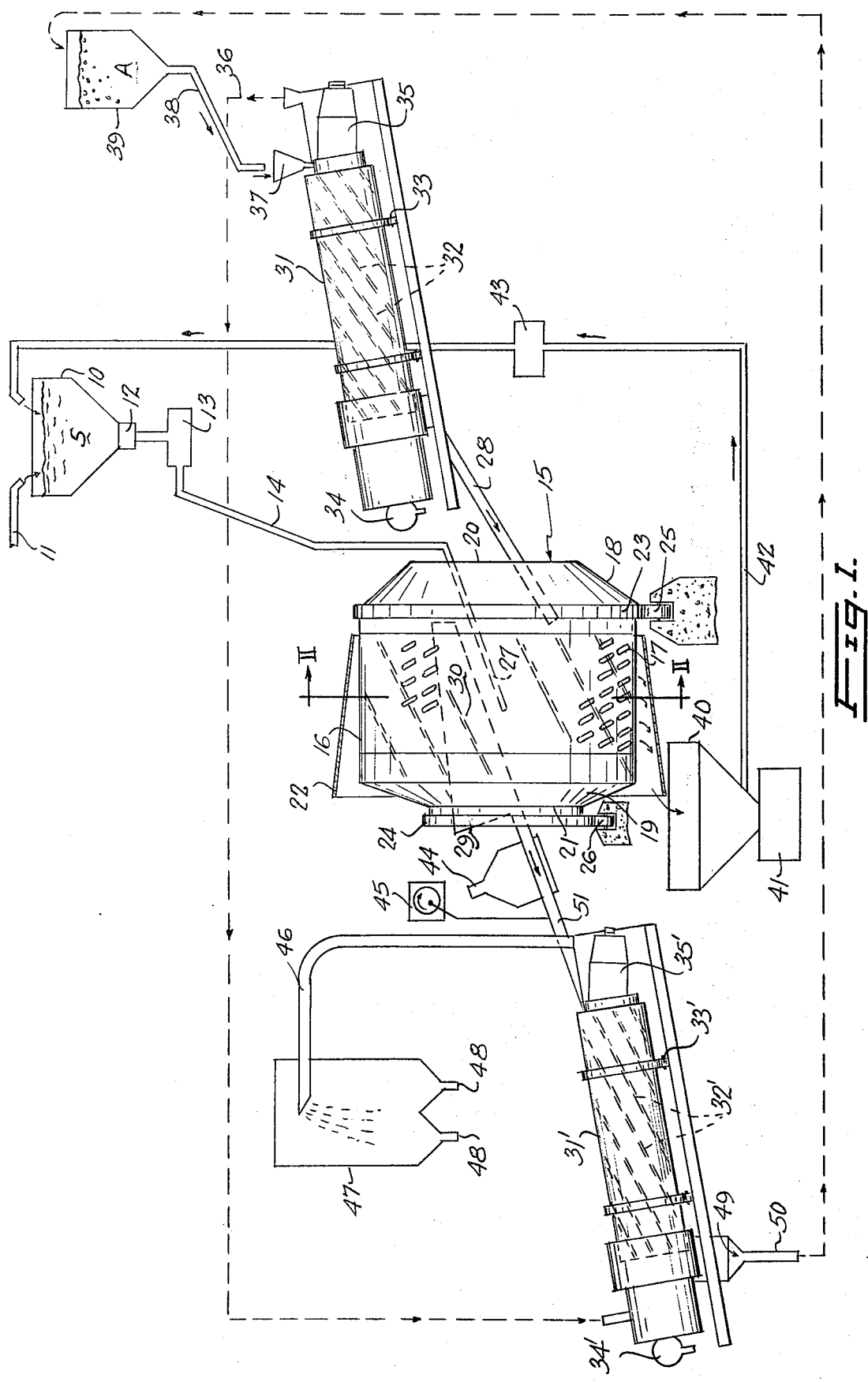

PROCESS FOR TREATING SEWAGE SLUDGE

This is a continuation of application Ser. No. 333,539, filed Feb. 20, 1973 and now abandoned.

BACKGROUND OF THE INVENTION

1. Field of the Invention

This invention relates to a process for treating sewage sludge.

2. Description of the Prior Art

One of the major problems associated with sewage treatment plants is the disposal of the sludge which is formed as an essential part of the process. This sludge as it emerges from the digestion tanks will normally contain about 96% moisture and the disposal of this moisture-laden sludge is normally only completed effected by burning after it has been dried to a 60% moisture content in filter beds or drum-type vacuum filters. The labour and upkeep of the filter beds, etc., the cost of the fuel for burning and the fact that no resulting useful product is produced makes this a most expensive operation and, moreover, still creates a pollution problem in liberating large amounts of dust particles or ash into the atmosphere in the vicinity of the disposal plant.

Moreover, in trying to dispose of the surplus moisture from the disposal system, further difficulties are encountered in terms of pollutants that may still remain in this water.

A method for trying to overcome the above difficulties is described in Young U.S. Pat. No. 2,723,954 issued Nov. 15, 1955. In that patent a method is described in which a slurry of the sludge is processed by momentarily introducing into a quantity of the sludge slurry an aggregate heated to a temperature of at least 212°F and below the ignition temperature of the slurry to cause solids of the slurry to adhere thereto. This aggregate with the sludge slurry adhering thereto is then subjected to further heating as it moves along an inclined path to effect drying of the adherng slurry both from within by virtue of the heat of the aggregate and from without by the external heating. The aggregate with the dried slurry encrustation thereon is then subjected to a tumbling action while moving on an inclined path to break away the encrustations and pulverize it into a powder or dust which is collected.

By applying sufficient heat during drying, all harmful bacteria, etc. in the sludge is destroyed so that the sludge powder can be safely used as an agricultural fertilizer. The aggregates with the encrustations removed is recycled through the system.

In operating the prior system, the procedure of dropping the preheated aggregate pieces into a tank of sludge slurry was found to be an awkward one to control, particularly in terms of being able to quickly form an encrustation on the aggregate while minimizing heat losses and thereby minimizing the total heat input requirements for the system.

It is, therefore, the object of the present invention to improve upon the prior Young treatment system by providing a novel and more efficient method and apparatus for contacting the sludge slurry with the preheated aggregate pieces.

SUMMARY OF THE INVENTION

According to this invenntion a rotating drum contactor is used which rotates on a substantially horizontal axis. The drum includes a substantially cylindrical portion and annular end walls leaving axial end openings. The cylindrical wall of the drum includes a portion with an inner perforated wall and an outer solid wall surrounding the perforated wall, forming an annular chamber therebetween.

The inner wall of the drum has longitudinally extending and inwardly projecting baffles.

In an upper region of the drum is an inclined collecting trough for collecting coated aggregate pieces.

In operation, aggregate pieces preheated to a temperature of at least 212°F and below the ignition temperature of the slurry are continuously fed into a lower region of the drum which is slowly rotating. In a central region of the drum the sludge slurry is continuously distributed downwardly so that it comes into contact and coats onto the aggregate pieces in the lower region of the drum. Any of the slurry which does not substantially instantaneously adhere to the particles passes through the perforations in the inner wall of the drum and into the annular chamber to be collected and recycled.

The coated aggregate pieces are carried upwardly in the drum by means of the baffles and in an upper region fall away from the baffles into the trough in the upper region of the drum. This trough collects the coated aggregate pieces from where they are carried down an inclined trough and through a drier for complete drying of the coating and thence into a further tumbler drum where the surface encrustations are broken away from the aggregate particles and pulverized. The pulverized encrustations are collected while the aggregate pieces are recycled through the system.

DESCRIPTION OF PREFERRED EMBODIMENTS

Details of the invention will now be further described in conjunction with the accompanying drawings in which, FIG. 1 is a diagrammatic view illustrating the process and apparatus of the invention;

Figure 3:
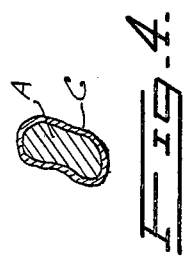
FIG. 3 is a view of an aggregate piece before being subjected to the slurry.
Figure 4:
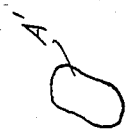
FIG. 4 is a cross-sectional view of the aggregate piece encrusted with slurry and, FIG. 5 is a view showing the aggregate piece after the encrustation has been removed.
Figure 5:
Figure 2:
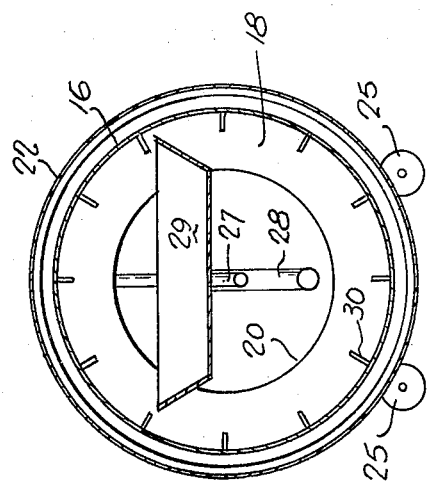
FIG. 2 is a perspective view showing details of the contactor drum.

The general layout of the system can best be seen from FIG. 1 with sludge slurry S being received from a sewage treatment plant through pipeline 11 for collection in a holding tank 10. In the bottom of tank 10 is an agitator 12 and the slurry is pumped from holding tank 10 via pump 13 through line 14 into a rotating tumbler drum 15.

This tumbler drum is the main feature of the invention and has a cylindrical portion 16 with the ends thereof being partially closed by means of the truncated conical end walls 18 and 19 leaving axial end openings 20 and 21 respectively. A portion of the cylindrical wall 16 contains perforations 17 and this perforated region is surrounded by a truncated conical skirt 22 leaving an annular space between the skirt and the cylindrical wall 16.

A pair of steel rings 23 and 24 are mounted on the drum and these rest upon support wheels 25 and 26 respectively to support the tumbler drum for free rotation. An electric motor (not shown) is utilized for rotatating the drum at a slow speed.

The sludge slurry arriving in line 14 is distributed downwardly in the drum through a distributing head 27. This slurry in a lower region of the drum comes into contact with previously heated aggregate pieces A which enter the drum through chute 28. These aggregate pieces are at a temperature of about 212° to 325°F. The slurry in coming into contact with this hot aggregate immediately adheres to the aggregate forming a coating C thereon. The drum contains a series of longitudinal baffles 30, which may be angularly mounted with respect to the longitudinal axis of the drum, and these baffles divide the periphery of the interior of the drum into a series of compartments which carry the aggregate upwardly as the drum rotates. This means that immediately after being contacted by the downwardly falling sludge slurry, the hot aggregate is carried away from contact with the slurry and up into an upward region. The slurry which does not adhere to the aggregate during its contact time passes through the perforations 17 and into the surrounding skirt 22 for collection.

In the upper region within the drum cavity is mounted a collecting trough 29 so that the coated aggregate pieces in each peripheral compartment as they reach a certain point during the rotation of the drum are dumped from the compartment into the trough 29. From there they travel down an inclined chute 51.

The preheated aggregate particles which enter the drum 16 through chute 28 are heated in an inclined rotating drum 31. Angled ribs 32 are mounted within the drum to cause a tumbling action of the contents as the drum rotates. The drum is mounted on rollers 33 for free rotation and is rotated by means off an electric motor (not shown). The drum is heated by means of a burner 34 mounted at the lower end thereof and a fan 35 is provided at the upper end and for drawing the air heated by burner 34 through the drum in countercurrent flow to aggregate particles entering the drum through inlet hopper 37. The aggregate particles arrive in hopper 37 from a large hopper 39 through chute 38.

The excess slurry which is collected at the bottom of drum 15 by means of skirt 22 flows into a collecting hopper 40 having a vibrator 41 at the bottom thereof and this slurry is recycled through line 42 and pump 43 back into collection tank 10 for mixing with the fresh sludge coming from the treatment plant. Some small pieces of broken aggregate may pass through the perforations 17 and, if desired, these can be screened out of the sludge being recycled.

The coated aggregate collected in trough 29 as it moves down chute 51 passes through a heater 44 which causes external drying of the coating on the pieces. This means that the caoting is being simultaneously dried from the exterior by means of heater 44 and from the interior because of the heat previously applied to the pieces in the heating drum 31. To assist in the movement of the coated pieces down the chute a vibrator 45 is connected to the chute.

The coated particles emerging from chute 51 are in a dry state and they at this point enter a second inclined heating drum 31' which is similar in design to heating drum 31. It also has a burner 34' in the lower end and a fan 35' in the upper end for drawing hot air through the drum in counter current flow to the coated pieces. The hot air being drawn off the drum 31 by fan 35 is passed through conduit 36 into the lower end of drum 31' to assist in the heating of drum 31'. The counter current hot air flow through drum 31' causes complete drying of the coating on the pieces and the rotation of this drum with the continual tumbling action caused by the ribs 32' break the coating (which is now in the form of a hard encrustation) away from the particles in the form of a dust or powder. This dust or powder is entrained in the emerging hot air stream whereby it is separated from the aggregate and is carried from the upper end of drum 31' through conduit 46 into collector tank 47. The dust or powder can be withdrawn from the hopper 47 through outlets 48 for further use.

The complete drying and pulverizing which takes place in drum 31' also is effective in disintegrating any particulate material in the sludge, e.g. seeds, etc., which would be undesirable in an agricultural fertilizer.

The decoated aggregate pieces A' are collected in a hopper 49 in the region of the lower end of drum 31' and are transferred by means of a conveyor 50 back into hopper 39 for collecting aggregate pieces to start the cycle once again.

The entire system is preferably operated as much as possible as a closed system with all of the chutes, etc., being closed from the atmosphere to conserve heat. Thus, even the decoated aggregate pieces being collected in hopper 49 still retain a considerable amount of heat and all of this partially heated decoated aggregate is reused in the system. Only sufficient fresh aggregate is added into hopper 39 to make up any losses due to pulverization from the tumbling action of the drums 31 and 31'. Also, no unnecessary heat losses take place in drum 16 since the only heat being applied to that drum is contained within the aggregate pieces themselves and this is substantially entirely transferred to the sludge which forms the coating. The sludge which does not form any coating is quickly out of the influence of these heated pieces so that the sludge which is being recycled picks up very little if any heat from the heated pieces. In other words, all of the stored heat in the aggregate pieces is being used for the formation of the sludge coating thereon without any of it being wasted in needless heating of large amounts of sludge which is not immediately being adhered to the pieces.

In selecting the aggregate, a material must be selected which will withstand the tumbling action within the tumbler driers 31 and 31' without disintegration. The aggregate pieces typically have a major dimennsion of the order of about three-quarters to 1 inch and may conveniently be in the form of granite gravel, raw agricultural limestone, steel balls or fragments, open-hearth furnace slag or combinations thereof. Since the sludge powder being produced according to the invention is intended for use as an agricultural fertilizer, the aggregate material can advantageously be selected to compensate for soil deficiencies in the soils to be fertilized. For insance, if the particular soild being treated by the sludge powder has a lime deficiency, limestone aggregate is advantageously used. If phosphates are deficient, then certain forms of slug aggregates are preferred.

With the system of this invention it is also possible to conduct a preliminary filtration of the sludge slurry before it is fed through the system of the invention. This can be done by passing the slurry through a filter bed composed of a bed of crushed limestone. This removes a portion of the water and the solids of the sludge are deposited in the limestone of the bed. This sludge together with a quantity of the limestone which is picked up from the filter bed can be conveniently fed through the system of this invention. This helps to increase the drying efficiency because of the initial lower moisture content of the slurry.

I claim:

1. A method of treating sewage sludge which comprises continuously introducing into a lower region of a rotating contactor drum aggregate pieces preheated to a temperature between about 212° and 325°F, said contactor drum having a perforated cylindrical wall and a series of longitudinal baffles extending along the length of the cylindrical wall and dividing the periphery of the interior of the drum into a series of compartments which carry the aggregate pieces upwardly as the drum rotates, distributing onto said aggregate pieces while still in the lower region of the drum a slurry of sewage sludge whereby a portion of the slurry adheres to the aggregate pieces as a coating thereon, removing through said perforations any slurry which does not adhere to the aggregate pieces and recycling this into the slurry being fed into the drum, carrying the coated aggregate pieces within said compartments to an upper region of the drum, in said upper region dumping the coated aggregate pieces in said compartments into an inclined collector trough which extends substantially the full length of the contactor drum, directing the coated aggregate pieces from the trough along a downwardly inclined chute, subjecting the coated aggregate pieces on the inclined chute to external heat to effect drying of the coating both from within by virtue of the heat of the aggregate piece and from without, thereafter subjecting the aggregate pieces with dried slury encrustation thereon to a tumbling action in an inclined tumbler drum to break away and pulverize such encrustations, separating said pulverized sludge from the aggregate pieces by means of an air current, collecting the pulverized encrustations and recycling the decoated aggregate pieces through the system with sufficient fresh aggregate pieces being added to the recycled decoated aggregate pieces to maintain a constant flow of aggregate pieces through the system.

* * * * *